US012572634B2

(12) United States Patent
Lee et al.

(10) Patent No.: US 12,572,634 B2
(45) Date of Patent: Mar. 10, 2026

(54) ELECTRONIC DEVICE AND ENCRYPTION METHOD FOR ELECTRONIC DEVICE

(71) Applicant: SAMSUNG ELECTRONICS CO., LTD., Suwon-si (KR)

(72) Inventors: Jineui Lee, Suwon-si (KR); Yongcheol Park, Suwon-si (KR); Youngmin Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 17/881,068

(22) Filed: Aug. 4, 2022

(65) Prior Publication Data

US 2022/0374531 A1     Nov. 24, 2022

Related U.S. Application Data

(63) Continuation of application No. PCT/KR2021/001580, filed on Feb. 5, 2021.

(30) Foreign Application Priority Data

Feb. 5, 2020     (KR) ......................... 10-2020-0013568

(51) Int. Cl.
 *G06F 21/60*          (2013.01)
 *G06F 3/041*          (2006.01)
 *G06F 21/32*          (2013.01)

(52) U.S. Cl.
 CPC ............ G06F 21/32 (2013.01); G06F 3/0416 (2013.01); G06F 21/602 (2013.01)

(58) Field of Classification Search
 CPC ...... G06F 21/32; G06F 3/0416; G06F 21/602; G06F 21/606
 See application file for complete search history.

(56) References Cited

U.S. PATENT DOCUMENTS

| | | |
|---|---|---|
| 10,685,205 B2 | 6/2020 | Lee et al. |
| 10,741,621 B2 | 8/2020 | Choo et al. |

(Continued)

FOREIGN PATENT DOCUMENTS

| | | |
|---|---|---|
| EP | 3254235 A1 | 7/2023 |
| JP | 2018-85114 | 5/2018 |

(Continued)

OTHER PUBLICATIONS

Office Action dated Jul. 20, 2025 in KR Application No. 10-2020-0013568 and English-language translation.

*Primary Examiner* — Ryan J Jakovac
(74) *Attorney, Agent, or Firm* — Nixon & Vanderhye, P.C.

(57) ABSTRACT

An electronic device according to various embodiments comprises: a display; an image sensor disposed under the display configured to receive second information based on first information corresponding to light reflected from a subject being converted by passing through the display; a memory; and a processor operatively coupled to the display, the image sensor, and the memory, wherein the display may include: a light emitting unit including a plurality of light emitting diodes for generating light, a TFT layer on which a plurality of thin film transistors (TFTs) are mounted, and a conductive line electrically connected to the plurality of thin film transistors; the first information may be converted into second information by passing through the light emitting unit, the TFT layer, and the conductive line; and the processor may store the second information in the memory.

15 Claims, 11 Drawing Sheets

(56)           References Cited

U.S. PATENT DOCUMENTS

| | | |
|---|---|---|
| 11,308,310 B2 | 4/2022 | Lee et al. |
| 2019/0087628 A1 | 3/2019 | Choe et al. |
| 2019/0278895 A1* | 9/2019 | Streit ..................... G06V 40/45 |
| 2020/0034596 A1* | 1/2020 | He ..................... G06V 40/1324 |
| 2024/0214195 A1* | 6/2024 | Borgatti .................. G06F 21/32 |

FOREIGN PATENT DOCUMENTS

| | | |
|---|---|---|
| KR | 10-2016-0001728 | 1/2016 |
| KR | 20170106425 A | 9/2017 |
| KR | 10-2019-0018334 | 2/2019 |
| KR | 10-2019-0031401 | 3/2019 |
| KR | 10-2019-0037728 | 4/2019 |
| KR | 20190100839 A | 8/2019 |
| KR | 10-2020-0112614 | 10/2020 |

* cited by examiner

FIG. 8

START

822 — RADIATE LIGHT ONTO MOVING SUBJECT

823 — RECEIVE, BY IMAGE SENSOR, IDENTIFICATION TARGET INFORMATION

824 — COMPARE SECOND INFORMATION WITH IDENTIFICATION TARGET INFORMATION

NON-COINCIDENCE → 826 — NOTIFY FAILURE

COINCIDENCE

825 — PERFORM CORRESPONDING OPERATION

END

811 — RADIATE LIGHT ONTO MOVING SUBJECT

812 — RECEIVE, BY IMAGE SENSOR, SECOND INFORMATION

813 — STORE SECOND INFORMATION IN MEMORY

910

921

TRANSFER FUNCTION

922

TRANSFER FUNCTION$^{-1}$

930

ELECTRONIC DEVICE AND ENCRYPTION METHOD FOR ELECTRONIC DEVICE

CROSS-REFERENCE TO RELATED APPLICATIONS

This application is a continuation of International Application No. PCT/KR2021/001580 designating the United States, filed on Feb. 5, 2021, in the Korean Intellectual Property Receiving Office and claiming priority to Korean Patent Application No. 10-2020-0013568, filed on Feb. 5, 2020, in the Korean Intellectual Property Office, the disclosures of which are incorporated by reference herein in their entireties.

BACKGROUND

Field

The disclosure relates to an electronic device and an encryption method for the electronic device, which can perform encryption of a visual image.

Description of Related Art

Mobile devices, such as a smart phone, a tablet PC, a portable multimedia player (PMP), a personal digital assistant (PDA), a laptop personal computer (laptop PC), and a wearable device such as a wrist watch and a head-mounted display (HMD) use an encryption method using user's various kinds of bio information.

The various kinds of bio information may be, as an example, user's fingerprint information, iris information, and information related to blood vessel.

The user's bio information may be stored in an electronic device in the form of an image through various methods. For user authentication, an image being received in the electronic device and a stored image related to the bio information may be compared with each other.

When a security incident occurs in the user's electronic device, the bio information related image being stored in the electronic device may leak to an outside for authentication.

SUMMARY

Embodiments of the disclosure provide an electronic device and an encryption method for the electronic device, in which the original image does not leak even if information stored in the electronic device leaks to an outside.

An electronic device according to various example embodiments disclosed in the disclosure may include: a display; an image sensor disposed under the display configured to receive second information based on first information corresponding to light reflected from a subject being converted through penetration of the display; a memory; and a processor operatively connected to the display, the image sensor, and the memory, wherein the display includes: a light emitting unit including a plurality of light emitting diodes configured to generate light, a thin film transistor (TFT) layer mounted with a plurality of thin film transistors (TFTs), and a conductive line electrically connected to the plurality of thin film transistors, wherein the first information is converted into the second information through penetration of the light emitting unit, the TFT layer, and the conductive line, and wherein the processor is configured to store the second information in the memory.

An encryption method for an electronic device according to various example embodiments disclosed in the disclosure may include: receiving, by an image sensor disposed under a display, second information based on first information corresponding to light reflected from a subject being converted through penetration of the display; and storing, by a processor, the second information in a memory, wherein the display includes: a light emitting unit including a plurality of light emitting diodes configured to generate light, a thin film transistor (TFT) layer mounted with a plurality of thin film transistors (TFTs), and a conductive line electrically connected to the plurality of thin film transistors, and wherein the first information is converted into the second information through penetration of the light emitting unit, the TFT layer, and the conductive line.

According to various example embodiments disclosed in the disclosure, since the original image is encrypted and stored, the original image can be prevented or blocked from leaking even if the information stored in the electronic device leaks to the outside, and thus excellent security performance can be expected.

BRIEF DESCRIPTION OF THE DRAWINGS

In relation to the description of the drawings, the same or similar reference numerals may be used for the same or similar elements. In addition, the above and other aspects, features and advantages of certain embodiments of the present disclosure will be more apparent from the following detailed description, taken in conjunction with the accompanying drawings, in which:

FIG. 8 is a flowchart illustrating an example operation performed by an electronic device according to various embodiments;

DETAILED DESCRIPTION

Figure 1:
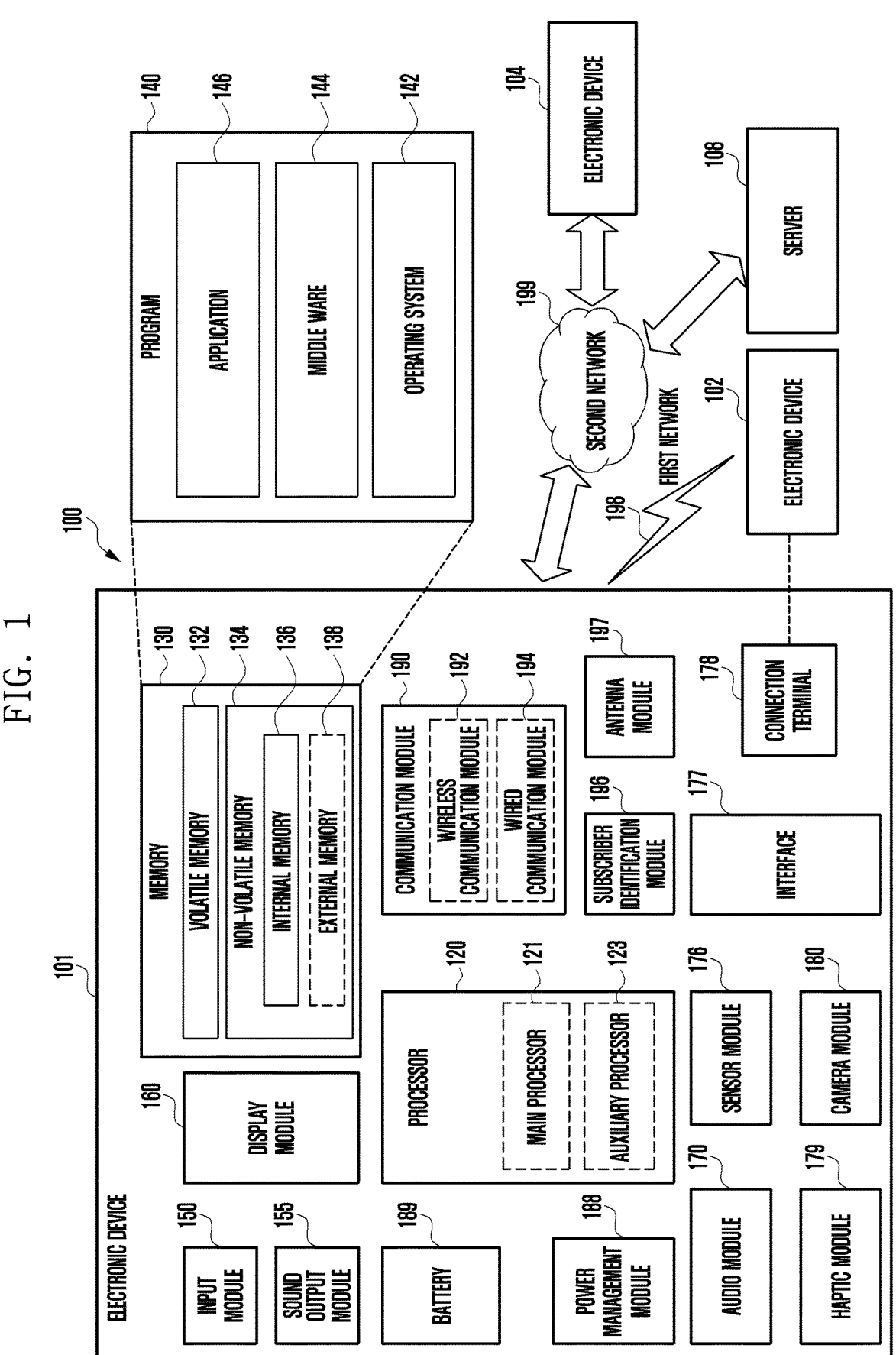
FIG. 1 is a block diagram illustrating an example electronic device in a network environment according to various embodiments.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
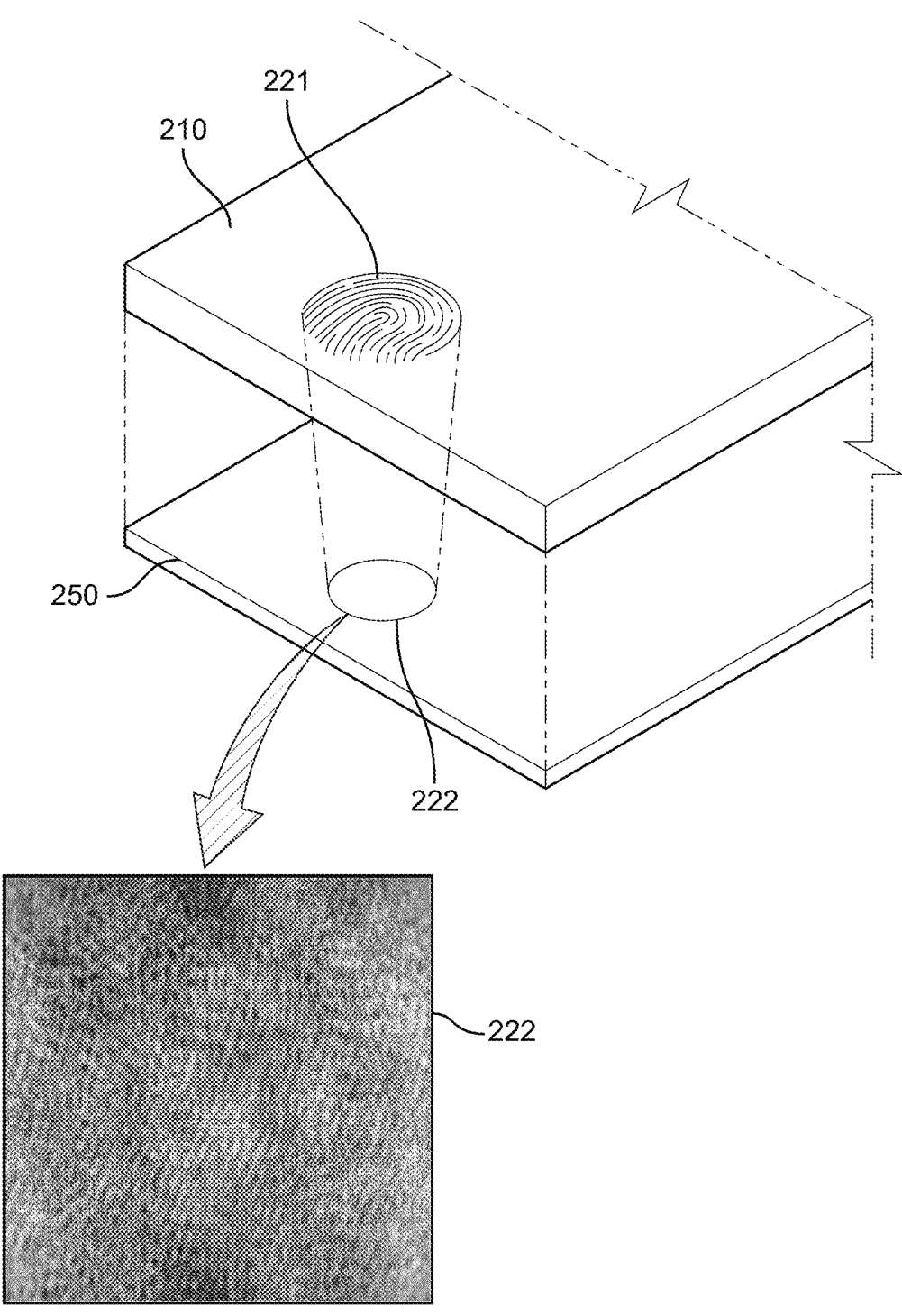
FIG. 2 is a diagram illustrating an example in which first information having passed through a display is converted into second information according to various embodiments.

FIG. 2 is a diagram illustrating an example of first information having passed through a display being converted into second information according to various embodiments.

According to various embodiments, a display 210 (e.g., display device 160 of FIG. 1) of an electronic device (e.g., electronic device 101 of FIG. 1) may include a plurality of elements having different light permeability. For example, the display 210 may have a structure in which a plurality of layers having different light permeability are laminated. For example, the elements disposed on the plurality of layers included in the display 210 may have different permeability. In the display 210, an area having a relatively high permeability and an area having a relatively low permeability may be present. As described above, the areas having different permeability may form a specific pattern.

According to various embodiments, information (hereinafter, referred to as "first information 221") corresponding to light incident to the display 210 may be different from information (hereinafter, referred to as "second information 222") corresponding to light having penetrated the display 210. The first information 221 may be converted into the second information 222 by passing through the pattern of the display 210. The light incident to the display 210 may be reflected, refracted, diffracted, scattered, and dispersed by passing through areas having different light permeability. Through the above-described phenomena, the first information 221 may be converted into the second information 222.

As illustrated in FIG. 2, the original fingerprint image of a user before passing through the display 210 may be called the first information 221 corresponding to the light reflected from the fingerprint of the user. The first information 221 corresponding to the original fingerprint image may pass through the display 210, and may be converted into the second information 222. In addition, the first information corresponding to the light reflected from various subjects may be converted into the second information by passing through the display 210. For example, the first information may be an image corresponding to an iris of the user.

According to various embodiments, the second information 222 corresponding to the light having passed through the display 210 may be received through an image sensor 250 disposed under the display 210. The image sensor 250 may include an element that converts light into an electrical signal. For example, the image sensor 250 may include a plurality of photodiodes (PDs).

According to various embodiments, the light radiated from the element (e.g., light emitting unit 420 of FIG. 4A) generating the light on the display 210 may be reflected from the subject to generate the first information 221. Further, as another example, light naturally generated in an environment in which the electronic device is present or light artificially generated may be reflected from the subject to generate the first information 221. According to various embodiments, the electronic device may include an auxiliary light emitting unit (not illustrated) radiating light onto the subject. In this case, the light radiated from the auxiliary light emitting unit may be reflected from the subject to generate the first information 221.

Figure 3:
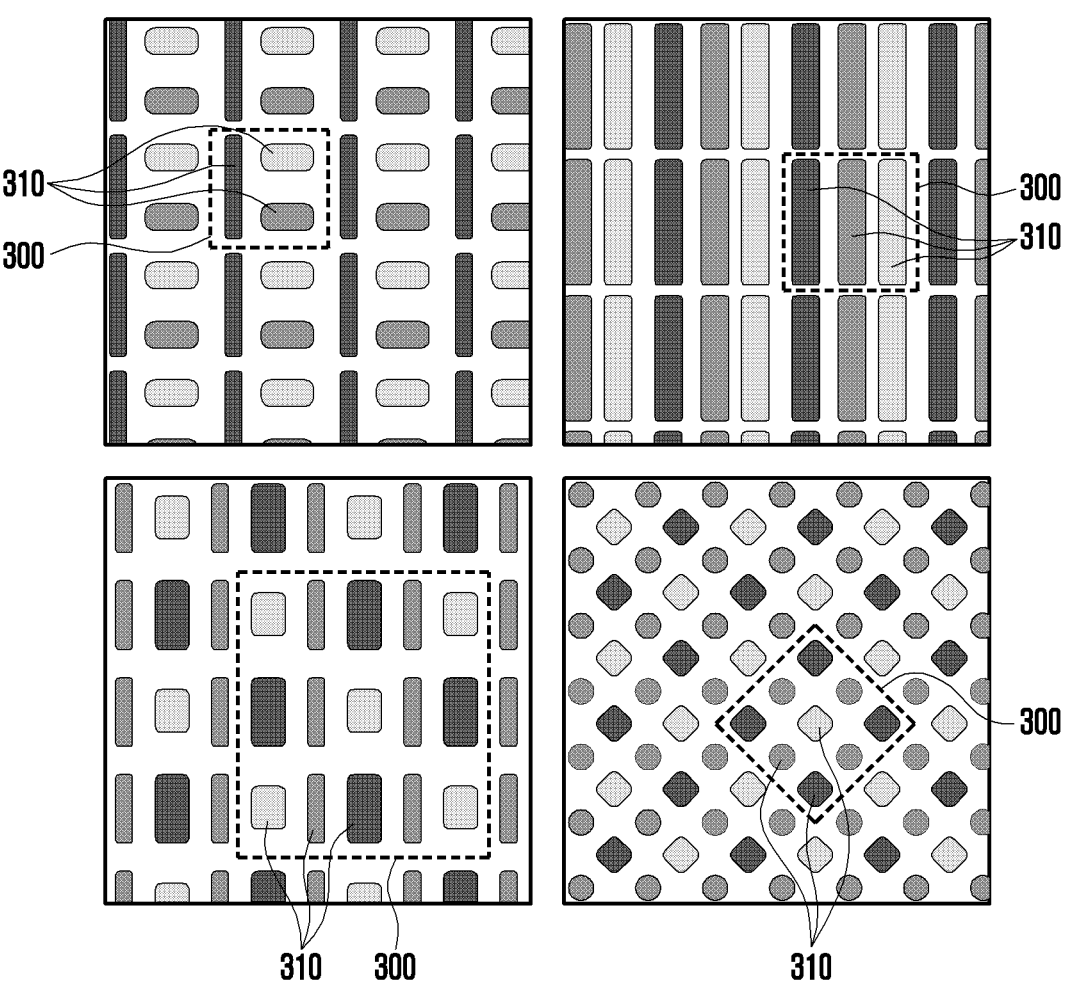
FIG. 3 is a diagram illustrating an example pixel arrangement of a display according to various embodiments.
Figure 4A:
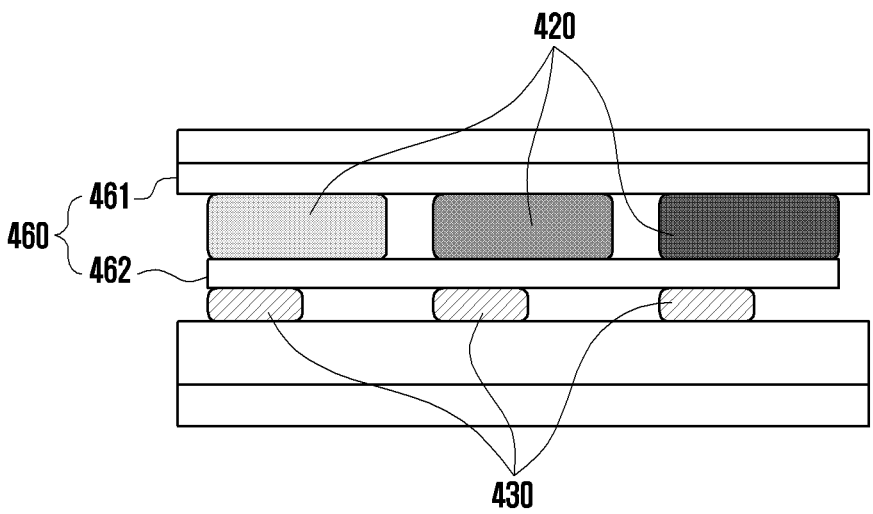
FIG. 4A is a cross-sectional view of a display according to various embodiments.
Figure 4B:
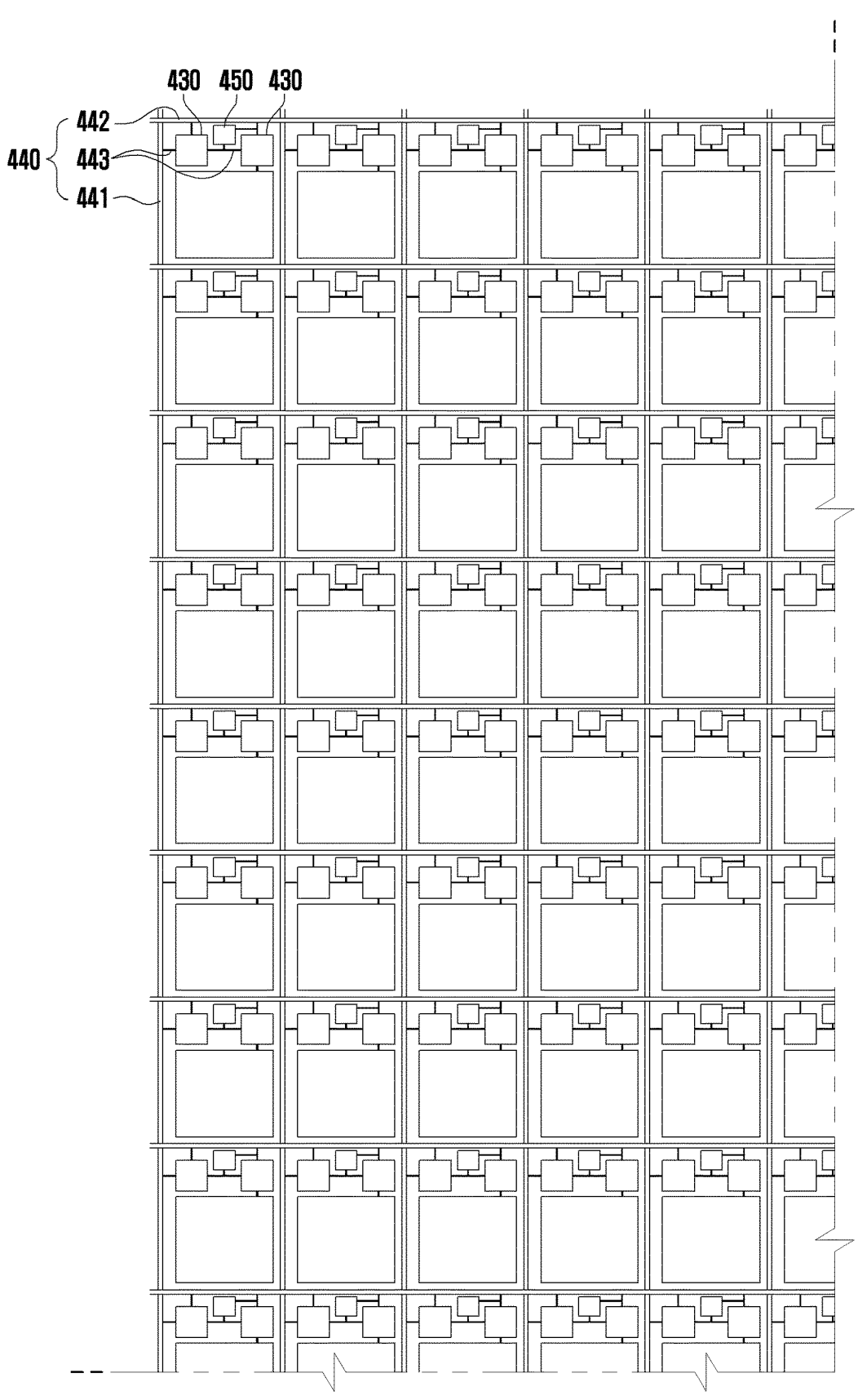
FIG. 4B is a wiring diagram of a display according to various embodiments.

FIG. 3 is a diagram illustrating an example pixel arrangement of a display according to various embodiments. FIG. 4A is a cross-sectional view of an example display according to various embodiments, and FIG. 4B is a wiring diagram of an example display according to various embodiments.

According to various embodiments, the display (e.g., display 210 of FIG. 2) may include a light emitting unit (e.g., including light emitting diodes) 420, a plurality of thin film transistors (TFTs) 430, and a conductive line 440 electrically connected to the thin film transistors 430 and the light emitting unit 420. The pattern of the display as described above may be formed by the arrangement of the light emitting unit 420, or the thin film transistors 430 and the conductive line 400 connected thereto or a combination thereof.

A pattern by the arrangement of the light emitting unit 420 will be described.

According to various embodiments, the display may include a pixel 300 including a plurality of sub pixels 310. According to various embodiments, the display included in the electronic device according to various embodiments disclosed in the disclosure may be an OLED type display including a plurality of organic light emitting diodes (OLEDs). The OLED type display may include the sub pixels 310 in which the plurality of organic light emitting diodes (e.g., light emitting unit 420 of FIG. 4A) generate light of a specific wavelength. The plurality of sub pixels 310 may include one pixel 300. For example, the pixel 300 may include at least one sub pixel 310 generating light of wavelengths corresponding to red, green, and blue. According to an embodiment, the organic light emitting diode may generate light substantially corresponding to white, and the pixel 300 may include at least one color filter filtering the light of white into light of red, green, and blue.

According to various embodiments, the pixel 300 and the sub pixels 310 of the display may be arranged in various methods. FIG. 3 illustrates a part of various examples of the arrangement of the pixel 300 and the sub pixels 310. By the arrangement of the pixel 300 and the sub pixels 310, a pattern may be formed on the display. As described above, the first information may be converted into the second information by the arrangement of the pixel 300.

The display according to various embodiments of the disclosure is not limited to the OLED type display. For example, the display may be a liquid crystal display (LCD). The LCD type display may include a light emitting unit generating light, a liquid crystal layer of which the orientation direction is changed in accordance with an electrical signal, and a color filter filtering the light generated from the light emitting unit into the light of the specific wavelength. The pixel of the LCD type display may include at least one color filter filtering the light into the wavelengths of the light corresponding to red, green, and blue. A black matrix having low permeability may be disposed between the color filters in order to distinguish the light having penetrated the color filter. Since there is a difference in permeability between the pixel and the black matrix, a pattern may be formed even on the LCD type display by the arrangement of the pixel and the black matrix. As described above, through the arrangement of the black matrix and the pixel, the first information may be converted into the second information.

A pattern formed by the light emitting unit 420, the thin film transistors 430, and the conductive line 440 will be described.

According to various embodiments, the light emitting unit 420 may include an organic light emitting diode. The light emitting diode 420 may be electrically connected to an electrode unit (e.g., including an electrode) 460 for supplying an electric energy to the organic light emitting diode. For example, based on FIG. 4A, a cathode 461 may be disposed on an upper side of the light emitting unit 420 and may be connected to the light emitting unit 420, and an anode 462 may be disposed on a lower side of the light emitting unit 420 and may be connected to the light emitting unit 420.

According to various embodiments, the thin film transistor 430 may function as a switch for each of the sub pixels 310. The thin film transistor 430 may be formed to include at least one of an n-type semiconductor and a p-type semiconductor. The thin film transistor 430 may include source and drain electrodes and a gate corresponding to a passage between the source and drain electrodes (not illustrated). In accordance with a voltage being applied to a gate electrode (not illustrated) connected to the gate, current may or may not flow from the source to the drain. The thin film transistor 430 may turn on or off the organic light emitting diode of the sub pixel connected to the thin film transistor 430 through adjustment of a gate voltage.

According to various embodiments, the conductive line 440 may be a line having conductivity for transferring the electric signal. The conductive line 440 may include a data line 441, a signal line 442, and a connection line 443 connecting the data line 441 and the signal line 442 to the thin film transistor 430 and the organic light emitting diode. The data line 441 may be connected to the source electrode or the drain electrode (not illustrated) of the thin film transistor 430 through the connection line 443. The signal line 442 may be connected to the gate electrode (not illustrated) of the thin film transistor 430 through the connection line 443. In accordance with the electric signal being applied to the data line 441 and the signal line 442, the light emitting unit 420 connected to at least one of the plurality of thin film transistor 430 may be turned on.

According to various embodiments, the conductive line 440 may be connected to a capacitor 450. The capacitor 450 may temporarily store an electrical energy being transferred by the conductive line 440. The light emitting unit 420 may be driven by the electrical energy stored in the capacitor 450.

According to various embodiments, an area on which the thin film transistor 430, the conductive line 440, and the capacitor 450 are disposed may have a low light permeability as compared with another area. A pattern may be formed in accordance with the arrangement of the thin film transistor 430, the conductive line 440, and the capacitor 450. The first information (e.g., first information 221 of FIG. 2) may be converted into the second information (e.g., second information 222 of FIG. 2) by the pattern formed by the thin film transistor 430, the conductive line 440, and the capacitor 450.

As described above, the first information (e.g., first information 221 of FIG. 2) corresponding to the light being incident to the display (e.g., display 210 of FIG. 2) may be converted into the second information (e.g., second information 222 of FIG. 2) by passing through the pattern formed by the various elements included in the display.

Figure 5:
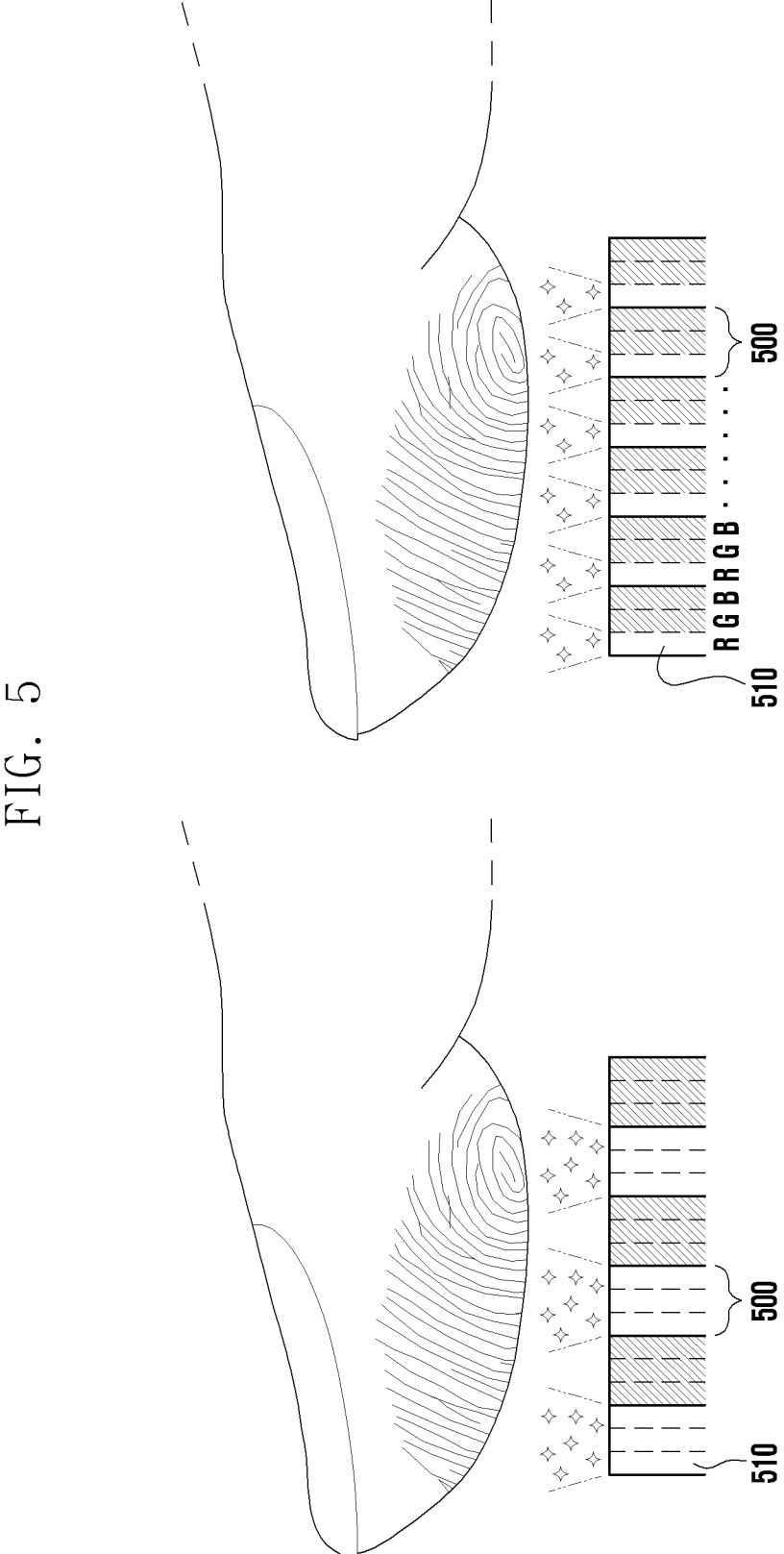
FIG. 5 is a diagram illustrating an example of a pattern of light being radiated onto a subject according to various embodiments.

FIG. 5 is a diagram illustrating an example pattern of light being radiated onto a subject according to various embodiments.

According to various embodiments, the second information may be obtained using a pattern of the light being radiated onto the subject in addition to an internal pattern of the display. The light may be radiated onto the subject through the light emitting unit (e.g., light emitting unit 420 of FIG. 4A) of the display or an auxiliary light emitting unit (not illustrated) of the electronic device. The light emitting pattern of the light emitting unit of the display or the auxiliary light emitting unit may be determined by the control of the processor (e.g., processor 120 of FIG. 1) of the electronic device.

For example, as illustrated on the left side of FIG. 5, the light may be radiated only from the light emitting unit disposed in a specific area among areas facing the subject. The light may be emitted only from a specific pixel among pixels 500 of the display. Further, the light of the specific wavelength may be radiated onto the subject. For example, as illustrated on the right side of FIG. 5, the red light may be emitted from a specific sub pixel 510.

Further, the image sensor (e.g., image sensor 250 of FIG. 2) may receive the second information for a predetermined time. While the image sensor receives the second information, the pattern of the light being radiated onto the subject may be variously changed. For example, while the image sensor receives the second information, the pattern may be changed by changing the wavelength of the light being radiated onto the subject or by varying the area from which the light is radiated. In addition, the light may be radiated onto the subject in various patterns.

The pattern of the elements included in the display may be fixed by the design of the display, but the pattern of the light being radiated onto the subject may be variously changed. By diversifying the pattern for radiating the light onto the subject, different kinds of second information may be obtained with respect to the same subject.

Figure 6:
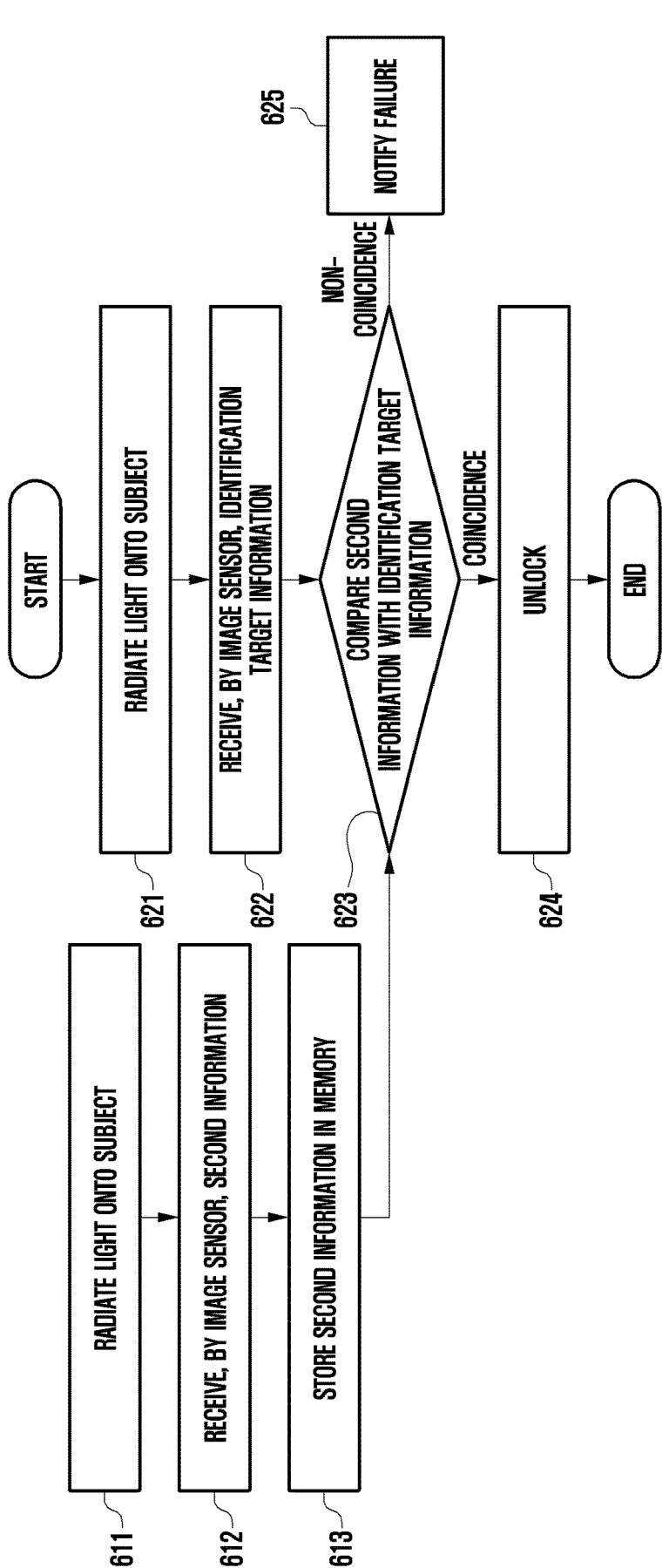
FIG. 6 is a flowchart illustrating an example unlocking operation of an electronic device according to various embodiments.

FIG. 6 is a flowchart illustrating an example unlocking operation of an electronic device according to various embodiments.

According to various embodiments, the electronic device may be unlocked through comparison of the second information (e.g., second information 222 of FIG. 2) stored in the memory (e.g., memory 130 of FIG. 1) with identification target information received by the image sensor (e.g., image sensor 250 of FIG. 2). The locking state of the electronic device may refer, for example, to a state in which an access of information stored in the electronic device is limited, and some of functions included in the electronic device are unable to be used.

According to various embodiments, the second information stored in the memory may be information related to a user's living body. For example, the second information may be information about the user's fingerprint, iris, and the shape of a specific region of the body.

An operation in which the second information corresponding to reference information is stored in the memory will be described.

The original image of bio information, such as user's fingerprint and iris, may be called the first information corresponding to the light reflected from the user's body. In order to obtain the first information, the light may be radiated onto the subject (611). The light may be radiated onto the subject through the light emitting unit (e.g., light emitting unit 420 of FIG. 4A) of the display (e.g., display 210 of FIG. 2) or through the auxiliary light emitting unit (not illustrated), or natural light may be the light being radiated onto the subject. The first information as described above may be transformed into the second information by passing through the display. The image sensor may receive the second information (612). The processor (e.g., processor 120 of FIG. 1) may store the second information received from the image sensor in the memory of the electronic device (613).

As described above, the electronic device disclosed in the disclosure may store the user's bio information as a deformed image (second information) that is not the original image type (first information). The second information may be considered as the encrypted first information. Even if the data stored in the user's electronic device leaks by user's mistake or by an attack, only the second information is stored in the electronic device, and thus the direct leakage of the user's bio information can be prevented/avoided. Accordingly, the electronic device according to various embodiments disclosed in the disclosure can provide an improved security function for the bio information stored in the electronic device.

According to various embodiments, the light may be radiated onto the subject (621). The light reflected from the subject may pass through the display. The image sensor may receive the identification target information (622). The processor of the electronic device including the display may compare the identification target information being received in the image sensor with the second information stored in the memory (623). The processor may determine the degree of coincidence between the identification target information and the stored second information. For example, the processor may compare the identification target information and the second information with each other using various image analysis techniques.

If the identification target information and the second information coincide with each other, the processor may unlock the electronic device by generating an unlock success signal (624). If the identification target information and the second information do not coincide with each other, the processor may maintain the locking of the electronic device by generating an unlock failure signal. In this case, the processor may display an unlock failure notification on the display (625). The coincidence of the identification target information with the second information may refer, for example, to a case where the degree of coincidence satisfies a predetermined criterion. The non-coincidence of the identification target information with the second information may refer, for example, to a case where the degree of coincidence does not satisfy the predetermined criterion.

According to various embodiments, the processor may sense a touch area that is an area in which the touch input is received on the display, and may activate a sensing area that is an area of the image sensor corresponding to the area in which the touch input is sensed. For example, in case of using a fingerprint, an area with which a finger comes in contact on the display may be considered as the touch area. The sensing area may be considered as an area corresponding to the touch area in the image sensor. As described above, by activating only the sensing area corresponding to the touch area, the power being used to drive the image sensor can be minimized/reduced. Further, the influence of noise that may be generated due to unnecessary area driving of the image sensor can be minimized/reduced.

Figure 7:
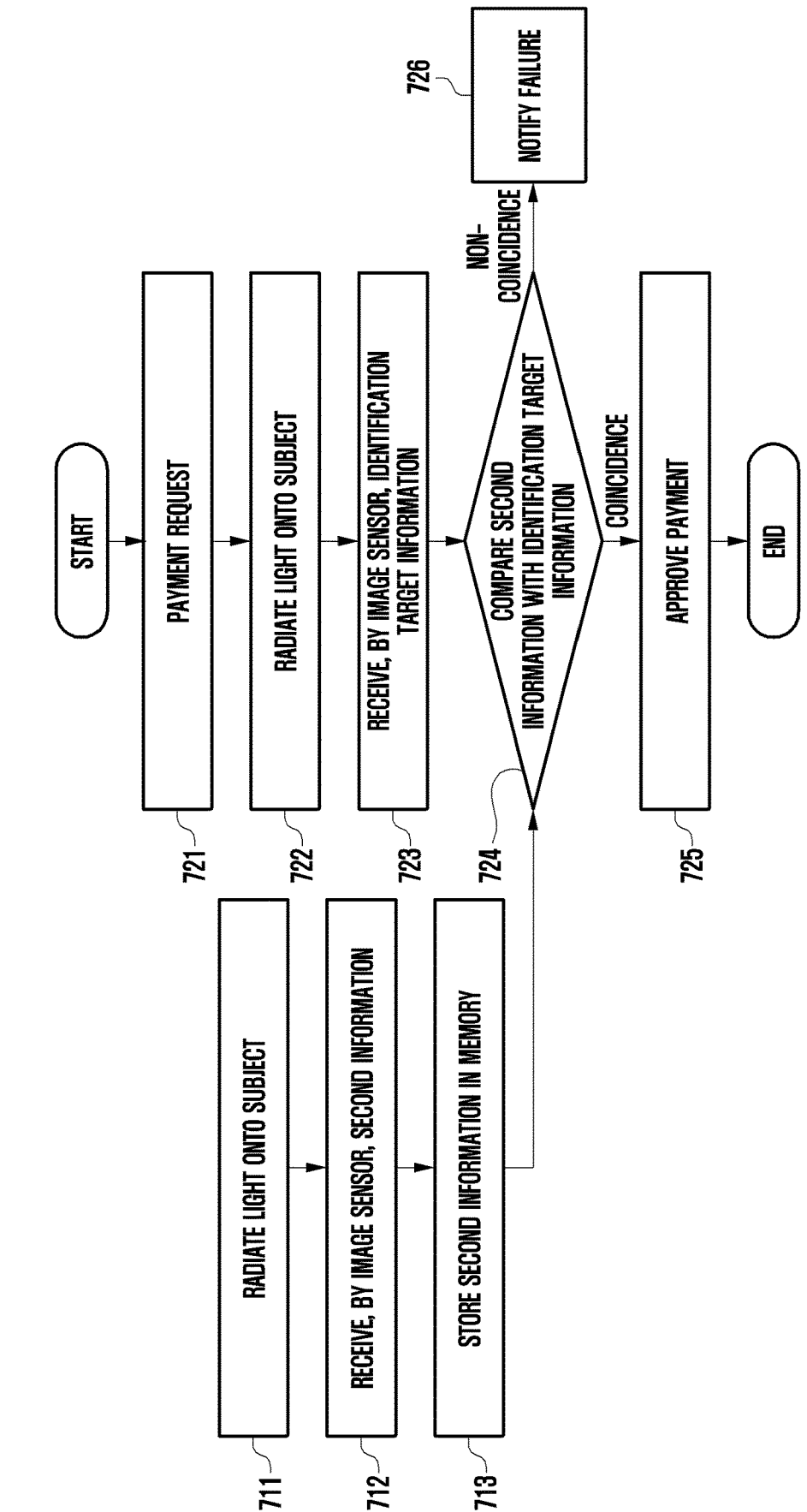
FIG. 7 is a flowchart illustrating an example payment operation of an electronic device according to various embodiments.

FIG. 7 is a flowchart illustrating an example payment operation of an electronic device according to various embodiments.

According to various embodiments, payment through the electronic device may be performed by comparing the second information stored in the memory (e.g., memory 130 of FIG. 1) with the identification target information being received in the image sensor.

An operation in which the second information (e.g., second information 222 of FIG. 2) corresponding to the reference information is stored in the memory will be described.

The original image of bio information, such as user's fingerprint and iris, may be called the first information corresponding to the light reflected from the user's body. In order to obtain the first information, the light may be radiated onto the subject (711). The light may be radiated onto the subject through the light emitting unit (e.g., light emitting unit 420 of FIG. 4A) of the display (e.g., display 210 of FIG. 2) or through the auxiliary light emitting unit (not illustrated), or natural light may be the light being radiated onto the subject. The first information as described above may be transformed into the second information by passing through the display. The image sensor may receive the second information (712). The processor (e.g., processor 120 of FIG. 1) may store the second information received from the image sensor in the memory of the electronic device (713).

As described above, the electronic device disclosed in the disclosure may store the user's bio information as a deformed image (second information) that is not the original image type (first information). The second information may be considered as the encrypted first information. Even if the data stored in the user's electronic device leaks by user's mistake or by an attack, only the second information is stored in the electronic device, and thus the direct leakage of the user's bio information can be prevented/avoided. Accordingly, the electronic device according to various embodiments disclosed in the disclosure can provide an improved security function for the bio information stored in the electronic device.

In accordance with a user's input or a communication signal, a payment request may be received in the electronic device (721). The processor may radiate the light onto the subject (722). The light having been reflected from the subject may pass through the display. The image sensor may receive the identification target information (723). The processor of the electronic device may compare the identification target information being received in the image sensor with the second information stored in the memory (724). The processor may determine the degree of coincidence between the identification target information and the stored second information. For example, the processor may compare the identification target information with the second information using various image analysis techniques.

If the identification target information and the second information coincide with each other, the processor may generate a payment authentication success signal. The payment may be approved based on the authentication success signal (725). The payment approval may refer, for example, to various kinds of payment information registered in the electronic device being authenticated based on the authentication success signal, and the payment is performed. For example, payment information, such as card information and account information registered in the electronic device, may be authenticated by the authentication success signal. If the identification target information and the second information do not coincide with each other, the processor may generate a payment authentication failure signal. In this case, the processor may display a payment authentication failure notification on the display (726). The coincidence of the identification target information with the second information may refer, for example, to a case where the degree of coincidence satisfies a predetermined criterion. The non-coincidence of the identification target information with the second information may refer, for example, to a case where the degree of coincidence does not satisfy the predetermined criterion.

FIG. 8 is a flowchart illustrating an example operation performed by an electronic device according to various embodiments.

According to various embodiments, various operations through the electronic device may be performed through comparison of the second information stored in the memory (e.g., memory 130 of FIG. 1) with the identification target information received in the image sensor. For example, one of applications installed in the electronic device may be driven, or one of functions included in the electronic device may be performed.

An operation in which the second information corresponding to the reference information is stored in the memory will be described.

The original image of bio information, such as user's fingerprint and iris, may be called the first information corresponding to the light reflected from the user's body. In order to obtain the first information, the light may be radiated onto a moving subject (811). The light may be radiated onto the subject through the light emitting unit (e.g., light emitting unit 420 of FIG. 4A) of the display (e.g., display 210 of FIG. 2) or through the auxiliary light emitting unit (not illustrated), or natural light may be the light being radiated onto the subject. The first information as described above may be transformed into the second information by passing through the display. The image sensor may receive the second information (812). The processor (e.g., processor 120 of FIG. 1) may store the second information received from the image sensor in the memory of the electronic device (813).

According to various embodiments, the second information stored in the memory may be information into which the first information corresponding to the various subjects has been transformed rather than the information related to the bio information.

According to various embodiments, the second information stored in the memory may be information into which the first information for the moving subject has been transformed. For example, the second information may be information corresponding to the movement of the user's hand. The image sensor may receive the second information while the user's hand moves.

According to various embodiments, the processor may radiate the light onto the moving subject (822). The light having been reflected from the subject may pass through the display. The image sensor may receive the identification target information (823). The processor of the electronic device may compare the identification target information being received in the image sensor with the second information stored in the memory. The processor may determine the degree of coincidence between the identification target information and the stored second information. For example, the processor may compare the identification target information with the second information using various image analysis techniques.

If the identification target information and the second information coincide with each other, the processor may perform a corresponding operation (825). The corresponding operation may refer, for example, to an operation of executing an application installed in the electronic device or an operation of performing a function that can be performed in the electronic device. For example, the processor may reproduce music by executing a music application, may execute a camera application for camera photographing, or may execute a browser application to display a specific web page. If the identification target information and the second information do not coincide with each other, the processor may notify of a failure (826). For example, the processor may display the failure on the display as a message.

Figure 9:
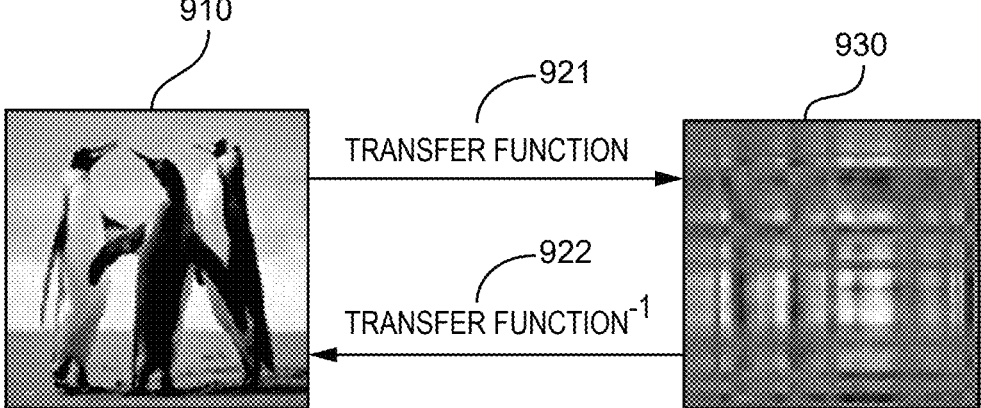
FIG. 9 is a diagram illustrating an example encryption method for an electronic device according to various embodiments.

FIG. 9 is a diagram illustrating an example encryption method for an electronic device according to various embodiments.

According to various embodiments, the processor (e.g., processor 120 of FIG. 1) may calculate a transfer function for converting the first information into the second information using the plurality of pieces of second information stored in the memory (e.g., memory 130 of FIG. 1) and the first information corresponding to the plurality of pieces of second information. For example, the processor may calculate the transfer function for converting the first information into the second information by applying a mathematical method, such as regression analysis or inductive reasoning.

According to various embodiments, the processor may convert the original image into an encrypted image by applying the transfer function to various images stored in the memory. As illustrated in FIG. 9, the original image 910 may be converted into the encrypted image 930 by applying the transfer function 921 to the original image 910. For example, when an image is stored in the electronic device, the image may be stored in a state where the image is converted into the encrypted image by applying the transfer function. Since the image is stored in the form of an encrypted image rather than the original image, the security can be reinforced.

According to various embodiments, if the user authentication has been made through various methods (e.g., biometric authentication, PIN authentication, and OTP authentication), the processor may restore the encrypted image to the original image using an inverse function of the transfer function. For example, as illustrated in FIG. 9, the original image 910 may be restored by applying the inverse function 922 of the transfer function to the encrypted image 930.

Figure 10:
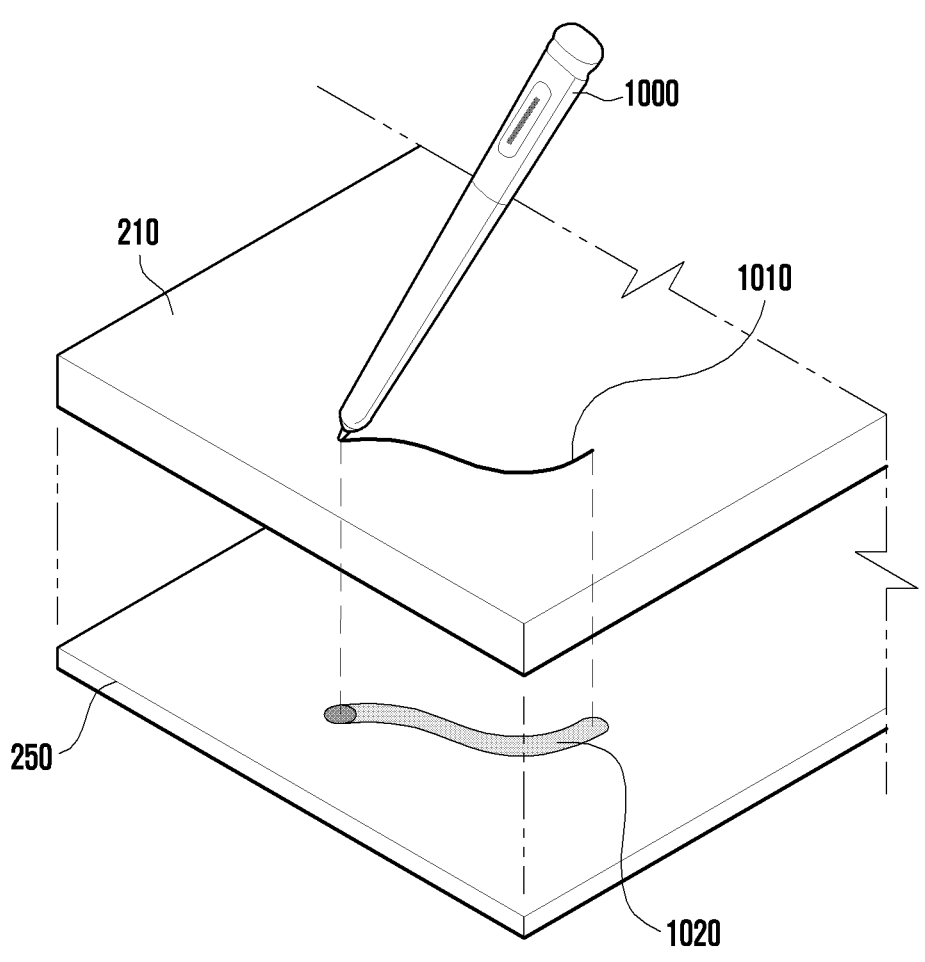
FIG. 10 is a diagram illustrating an example use of an electronic device according to various embodiments.

FIG. 10 is a diagram illustrating an example use of an electronic device according to various embodiments.

According to various embodiments, a pen input device 1000 (e.g., stylus pen) may come in contact with the display 210. First information 1010 being reflected by the pen input device 1000 may be converted into second information 1020 by passing through the display 210. The image sensor 250 may receive the second information 1020. If the pen input device 1000 moves, the point at which the second information 1020 is received may be changed on the image sensor 250. As illustrated in FIG. 10, the second information 1020 may correspond to an input path 1010 of the pen input device 1000. The point at which the second information 102 is received on the image sensor 250 may be converted into coordinate information for the image sensor 250. The processor (e.g., processor 120 of FIG. 1) may receive an input through the pen input device 1000 using the coordinate information.

According to various embodiments, the display 210 may include an electromagnetic induction panel (not illustrated) (e.g., digitizer) for receiving the input of the pen input device 1000. The electromagnetic induction panel (not illustrated) may recognize a movement path of the pen input device 1000 moving on the display 210. The processor may convert the information input by the pen input device 1000 into the second information by applying the transfer function as described above with reference to FIG. 9. For example, information, such as a letter or a figure, input by the user to the electronic device through the pen input device 1000 may be input to the transfer function, and may be converted into encrypted second information.

An electronic device according to various example embodiments may include: a display; an image sensor disposed under the display configured to receive second information based on first information corresponding to light reflected from a subject being converted through penetration of the display; a memory; and a processor operatively connected to the display, the image sensor, and the memory, wherein the display includes a light emitting unit including a plurality of light emitting diodes configured to generate light, a thin film transistor (TFT) layer mounted with a plurality of thin film transistors (TFTs), and a conductive line electrically connected to the plurality of thin film transistors, wherein the first information is converted into the second information through penetration of the light emitting unit, the TFT layer, and the conductive line, and wherein the processor is configured to store the second information in the memory.

Further, the light emitting unit of the display may radiate the light toward the subject so that the first information is transferred to the display.

Further, the electronic device may further include an auxiliary light emitting unit including light emitting circuitry configured to radiate light onto the subject so that the first information is transferred to the display.

Further, the processor may be configured to control the light emitting unit of the display so that the light radiated onto the subject has a specific pattern.

Further, the processor may be configured to control the auxiliary light emitting unit so that the light radiated onto the subject has a specific pattern.

Further, the processor may be configured to calculate a transfer function that converts the first information into the second information by analyzing a plurality of pieces of second information corresponding to a plurality of subjects.

Further, the processor may be configured to convert the original image stored in the memory into an encrypted image using the transfer function.

Further, the processor may be configured to restore the encrypted image to the original image using the transform function.

Further, the processor may be configured to compare identification target information received by the image sensor with the second information stored in the memory, and may determine whether to perform authentication based on the result of the comparison.

Further, the processor may be configured to perform a corresponding operation based on the result of the comparison.

Further, the processor may be configured to unlock the electronic device based on performing the authentication.

Further, the processor may be configured to sense a touch area in which a touch input occurs on the display, activate a sensing area corresponding to the touch area on the image sensor, and compare the identification target information received in the sensing area with the second information stored in the memory.

Further, the processor may be configured to generate a payment request signal based on performing the authentication.

Further, the image sensor may be configured to receive identification target information for a moving subject, and the processor may be configured to compare the second information on the moving subject stored in the memory with the identification target information, and may perform a corresponding operation based on the result of the comparison.

An encryption method for an electronic device according to various example embodiments may include: receiving, by an image sensor disposed under a display, second information based on first information corresponding to light reflected from a subject being converted through penetration of the display; and storing, by a processor, the second information in a memory, wherein the display includes a light emitting unit including a plurality of light emitting diodes configured to generate light, a thin film transistor (TFT) layer mounted with a plurality of thin film transistors (TFTs), and a conductive line electrically connected to the plurality of thin film transistors, and wherein the first information is converted into the second information through penetration of the light emitting unit, the TFT layer, and the conductive line.

Further, the encryption method may further include radiating, by the light emitting unit of the display, the light toward the subject.

Further, radiating the light toward the subject may be performed by the processor to control the light emitting unit of the display so that the light radiated onto the subject has a specific pattern.

Further, the encryption method may further include calculating, by the processor, a transfer function that converts the first information into the second information by analyzing a plurality of pieces of second information corresponding to a plurality of subjects.

Further, the encryption method may further include converting, by the processor, the original image stored in the memory into an encrypted image using the transfer function.

Further, the encryption method may further include: comparing, by the processor, identification target information received by the image sensor with the second information stored in the memory; and determining, by the processor, whether to perform authentication based on the result of the comparison.

Embodiments disclosed in the disclosure and drawings are merely provided for ease and convenience of explanation of the technical contents disclosed in the disclosure and examples to help understanding of the disclosure, but are not intended to limit the scope of the disclosure. Accordingly, it should be understood that all changes or modifications derived based on the technical idea of the disclosure are included in the scope of the disclosure. In other words, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display including a plurality of light emitting diodes, a thin film transistor (TFT) layer including a plurality of thin film transistors (TFTs), and a conductive line electrically connected to the thin film transistors;
an image sensor, disposed under the display;
memory; and
at least one processor,
wherein the at least one processor is configured to:
control the light emitting diodes to radiate light toward a subject to obtain first information to the display based on light reflected by the subject,
determine a transfer function based on converting the first information into second information, wherein the first information corresponds to light reflected from a user's body and the second information is encrypted through the converting of the first information by penetration of the thin film transistor layer and the conductive line,
convert the first information into the second information by applying the transfer function to the first information,
store the second information in the memory,
perform authentication using the second information and identification target information.

2. The electronic device of claim 1, wherein the light emitting diodes are configured to radiate light toward the subject to provide the first information to the display.

3. The electronic device of claim 2, wherein the at least one processor is configured to control the light emitting diodes so that the light radiated toward the subject has a specific pattern.

4. The electronic device of claim 1, further comprising an auxiliary light emitting diode configured to radiate light toward the subject to provide the first information to the display,
wherein the at least one processor is configured to control the auxiliary light emitting diode so that the light radiated toward the subject has a specific pattern.

5. The electronic device of claim 1, wherein the at least one processor is configured to determine the transfer function based on a plurality of pieces of second information corresponding to a plurality of subjects.

6. The electronic device of claim 5, wherein the at least one processor is configured to use the transfer function to convert an original image stored in the memory into a corresponding encrypted image or to restore an encrypted image to a corresponding original image.

7. The electronic device of claim 1, wherein the at least one processor is configured to:

compare identification target information received by the image sensor with identification information stored in the memory, and
determine whether to perform authentication based on the comparing.

8. The electronic device of claim 7, wherein the at least one processor is configured to perform a corresponding operation based on the comparing.

9. The electronic device of claim 7, wherein the at least one processor is configured to:
sense a touch area in which a touch input occurs on the display,
activate a sensing area corresponding to the touch area on the image sensor, and
compare the identification target information received in the sensing area with the identification information stored in the memory.

10. The electronic device of claim 7, wherein the at least one processor is configured to generate a payment request signal based on performing the authentication.

11. The electronic device of claim 1, wherein the image sensor is configured to receive identification target information for a moving subject, and
wherein the at least one processor is configured to:
compare information on the moving subject stored in the memory with the identification target information, and
perform a corresponding operation based on the comparing.

12. An encryption method for an electronic device comprising a display including a plurality of light emitting diodes, a thin film transistor layer including a plurality of thin film transistors, and a conductive line connected to the thin film transistors, the method comprising:
controlling the light emitting diodes to radiate light toward a subject to obtain first information to the display based on light reflected by the subject
determining a transfer function based on converting the first information into second information, wherein the first information corresponds to light reflected from a user's body and the second information is encrypted through the converting of the first information by penetration of the thin film transistor layer and the conductive line,
converting the first information into the second information by applying the transfer function to the first information,
storing the second information in memory, and
performing authentication using the second information and identification target information,
wherein the first information, which is directly related to biometric information, is not stored in the memory,
wherein the second information is not related to biometric information.

13. The encryption method of claim 12, further comprising radiating, by the light emitting diodes, light toward the subject,
wherein the light radiated toward the subject has a specific pattern.

14. The encryption method of claim 12, wherein the transfer function is determined by analyzing a plurality of pieces of second information corresponding to a plurality of subjects, and the method further comprises:
converting an original image into a corresponding encrypted image using the transfer function.

15. The encryption method of claim 12, further comprising:

comparing identification target information received by an image sensor with identification information stored in memory of the electronic device; and determining whether to perform authentication based on the comparing.

* * * * *